Feb. 13, 1951   J. B. WINTHER   2,541,182
ELECTRONIC CONTROL CIRCUIT FOR AN INDUCTIVE LOAD
Filed May 13, 1949

Jerrold B. Winther,
Inventor.
Haynes and Koenig
Attorneys.

Patented Feb. 13, 1951

2,541,182

UNITED STATES PATENT OFFICE 2,541,182

ELECTRONIC CONTROL CIRCUIT FOR AN INDUCTIVE LOAD

Jerrold B. Winther, Kenosha, Wis., assignor to Martin P. Winther, as trustee, Waukegan, Ill.

Application May 13, 1949, Serial No. 93,112

18 Claims. (Cl. 172—284)

This invention relates to an electronic control circuit for an inductive load and more particularly, to a regenerative electronic control circuit adapted for speed regulation of dynamoelectric apparatus such as electromagnetic slip couplings, dynamometers, brakes and the like.

Among the several objects of the invention may be noted the provision of a simple electronic circuit for controlling with increased sensitivity direct current flow in an inductive load constituted by the D. C. exciting coil, such as for example of an eddy-current slip coupling or the like, whereby in the case of such a coupling speed regulation may be improved; the provision of an electronic circuit for varying direct current flow in such an inductive load by means of a relatively transient input signal; the provision of an electronic circuit for improved regulation, without undue hunting, of dynamoelectric apparatus in general; and, the provision of an electronic circuit for dynamoelectric apparatus which may be adjusted for negative regulation. The invention is an improvement upon constructions such as shown in U. S. Patents 2,277,284 and 2,411,122. Other features will be in part apparent and in part pointed out hereinafter.

The electronic circuit of this invention generally comprises an inductive load, for example the exciting coil of an eddy-current clutch, which by means of a grid-controlled rectifier tube is periodically energized by controlled direct current pulses. An impedance is shunted across the load so as to absorb the inductive discharge of the load. A rectifier is associated with the load shunting impedance to isolate it from the plate of the grid-controlled rectifier so as to provide a D. C. potential. The D. C. voltage drop across the impedance resulting from the inductive discharge is impressed upon the control grid for regeneration or positive feedback. The voltage drop across the impedance is a positive function of the load discharge current and, thereby, the load energization current, the latter being controlled by the grid-controlled rectifier. The load energization may be initially varied by means of a control voltage input fed in series with the feedback voltage to the control grid. By this means in the case of an eddy-current slip coupling, dynamometer, or the like of which the inductive load constitutes the exciting coil, improved speed regulation may be obtained.

The invention accordingly comprises the elements and combinations of elements, features of construction, and arrangements of parts which will be exemplified in the structures hereinafter described, and the scope of the application of which will be indicated in the following claims.

In the accompanying drawings in which several of various possible embodiments are illustrated, Fig. 1 is a circuit diagram of an embodiment of this invention adapted for regulation of an eddy-current clutch;

Similar reference characters indicate corresponding parts throughout the several views of the drawings.

In said Patent 2,411,122 is shown an electronic thyratron grid-controlled rectifier circuit for supplying D. C. energy to an inductive load from an A. C. source of supply. This circuit includes a half-wave rectifier circuit with a "back-rectifier" across the load, the latter forming a path for the load current when the main rectifier is not firing. During the time that the load is being fed by the main rectifier, the polarity of the load is such that the anode of the back-rectifier tube is negative with respect to its filament and does not conduct. When the main rectifier ceases to conduct, the flux around the load coil collapses and the polarity of the load reverses. The current tends to continue flowing in the same direction and follows a path through the back-rectifier.

The present arrangement improves upon the above by inserting in the filament tap of the back rectifier an impedance including a resistor. The voltage drop across this resistor will be in direct proportion to the current in the back rectifier. This resistance (together with suitable anti-hunting filtering means) overcomes the former disadvantage that as an increased load was applied to a machine governed by the circuit, the governor generator was required to slow down to permit the control grid of the main rectifier to go sufficiently positive to obtain the needed load current. By means of the present invention, the resistance above-mentioned causes the voltage due to collapse of said field to affect the grid of the main rectifier as a positive potential, offsetting the amount that the governor generator needed heretofore to slow down. Thus by means of the invention, closer regulation of speed around a mean value can be brought about, and this without undue hunting.

Figure 2:
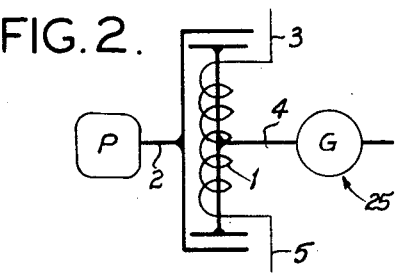
Fig. 2 is a diagrammatic view illustrating an eddy-current clutch such as is regulated by the circuit of Fig. 1.
Figure 1:
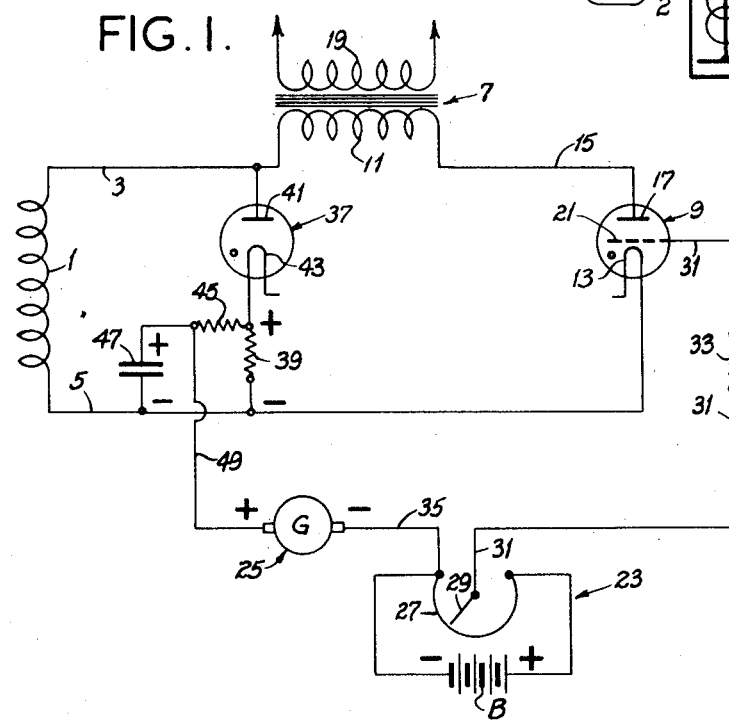

Referring to the embodiment illustrated in Figs. 1 and 2, there is shown an inductive load I, for example the field coil of an electromagnetic eddy-current clutch. As is well known, an eddy-current clutch generally comprises relatively rotary driving and driven members which are magnetically coupled, the amount of relative rotation or slip being determined by the degree of reduction of field coil excitation. Such an eddy-current clutch is shown diagrammatically in Fig. 2, wherein numeral 2 indicates the driving member and 4 the driven member. Letter P is the prime mover for the driver 2. Numeral 1 indicates the exciter or field coil.

The coil 1 is energized through lines 3 and 5 by means of a transformer 7 and a grid-controlled rectifier tube 9 connected in series. Line 3 connects with one end of the secondary 11 of transformer 7 and line 5 connects with the cathode 13 of tube 9. A lead 15 completes the circuit from the tube plate 17 to the other end of the transformer secondary 11. The transformer primary 19 is connected to a suitable source of alternating current such as for example 110 volt A. C., 60 cycles. The grid-controlled tube 9 operates as a half-wave rectifier to supply periodic pulses of direct current to the coil 1.

The degree of load energization or field excitation is controlled by grid 21. Impressed upon the grid 21 is a D. C. control voltage input obtained from a D. C. adjustable reference voltage source 23 and a D. C. speed responsive voltage source 25. The latter consists of a D. C. generator G, which it will be understood is mechanically connected to the driven member of the clutch. The reference voltage source includes a voltage divider 27 having a battery B connected across its fixed terminals. The movable contact arm 29 is connected by a lead 31 through a grid-current limiting resistor 33 to grid 21. The voltage divider and generator are connected in series by connection 35. The respective polarities of the speed responsive voltage and the reference voltage are arranged in opposition with the speed responsive source tending to apply a negative potential upon control grid 21.

In the arrangement of said Patent 2,277,284 the generator is connected directly to the cathode of the grid-controlled tube. The operation of the circuit of the patent may be summarized as follows: When the mechanical load on the driven member is increased and its speed decreased, the generator or speed responsive voltage decreases. Inasmuch as the generator applies a negative voltage component to the grid, a reduction thereof results in the grid swinging to a more positive condition and the vacuum tube passing more direct current. The clutch field coil energization is increased and the slip reduced, thus tending to bring the speed of the driven member back to a desired mean value. However, it will be noted that the speed does not completely return to the full desired value. The increased field current required under the increased load is obtained by providing a more positive grid bias caused by reduction of the generator speed which provides less negative bias. Therefore, the generator or driven member runs at a speed slightly less than the speed prior to the increase in load. This is undesirable in certain applications. The circuit of this invention provides improved regulation, in that the clutch speed is returned to the full value desired upon increase of load causing the transient decrease of speed.

Returning to the description of the Fig. 1 embodiment, a valve or rectifier 37 and an impedance or resistor 39 are connected in series with one another across and in shunt with the coil 1. The rectifier plate 41 is connected to line 3 and the rectifier cathode 43 is connected to resistor 39 which is in turn connected to line 5, thereby providing a coil-shunting circuit for inductive discharge of the coil and isolating the resistor 39 from the transformer and grid-controlled rectifier plate 17. A resistor 45 and a condenser 47 are connected in series across the impedance 39 for ripple filtering purposes. The grid circuit for tube 9 is completed from the positive terminal of generator G by a lead 49 connecting between the resistor 45 and condenser 47.

Operation is as follows:

When the polarity of transformer secondary 11 is such that the control rectifier plate 17 is positive, direct current flows through coil 1 and tube 9. The direction of current may be considered clockwise under the "conventional" theory or counterclockwise under the "electron" theory. Rectifier 9 permits flow of current therethrough. When the polarity of transformer secondary 11 is reversed, energization of coil 1 through tube 9 ceases and coil 1 discharges through rectifier 37 and the associated impedance components 39, 45 and 47. Actually the circuit values are such that under contemplated conditions of operation a substantially sustained direct current flows through coil 1 and a substantially constant D. C. voltage is impressed across resistor 39. It will be noted that the voltage impressed across these impedances is positive with respect to the control grid 21 and, therefore, is in opposition to the speed responsive voltage source 25 and supplements the reference voltage source 23. The time constant of resistor 45 and condenser 47 is sufficiently slow to prevent undue hunting as a result of positive feedback.

As torque is applied to the clutch, its speed initially drops and the speed responsive voltage from source 25 is initially decreased, thereby raising the grid bias of tube 9. The resultant increased excitation of field coil 1 reduces slip and returns the driven member to the desired speed. The increased energization of coil 1 from tube 9 also results in increased current flow through resistor 39 and rectifier 37, thereby providing an increased voltage drop across the resistor. By choosing appropriate circuit element values, the increase in the voltage drop across the impedance 39 may be made to provide a grid bias sufficient to maintain the increase in coil load current required by the increased torque. Thus, the increased rectified load current is not obtained from the generator, and the generator may return to the desired value of speed.

In fact, if the voltage drop across the impedance 39 is relatively large, it is possible not only to hold a constant speed, but to cause negative regulation. This over correction can cause the speed to rise under torque increase and fall under torque decrease.

Figure 3:
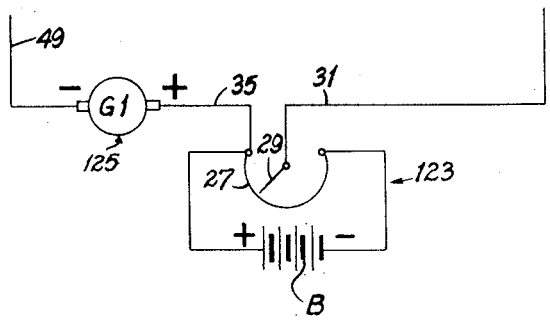
Fig. 3 is a partial circuit diagram illustrating arrangements of parts for adapting the circuit of Fig. 1 for regulation of a dynamometer.
Figure 4:
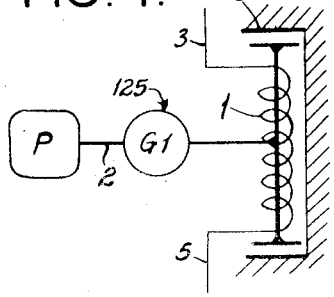
Fig. 4 is a diagrammatic view illustrating a dynamometer such as is regulated by the circuit as modified according to Fig. 3.

The invention may also be applied to a dynamometer such as illustrated in Fig. 4. In such instance, the circuit is the same as previously described except the polarities of the reference voltage source and speed responsive voltage are reversed, as shown in Fig. 3 wherein the former is indicated at 123 and the latter at 125. As shown in Fig. 4 the generator G1 is driven with the driving member 2 and prime mover P which is to be loaded by the dynamometer. The driven member in this case is a usual stator 6, fixed except for a small rocking movement.

Operation is analogous to that described in connection with the clutch. As the torque of the prime mover increases, the speed initially increases. The generator speed initially increases and the control grid bias is raised, thereby feeding increased current to the field coil. The increased field excitation in turn results in greater braking action and consequent reduction of speed to the desired value. The increase in grid bias required for the increased torque is initially supplied by the generator. The feedback from the impedance associated with the rectifier increases upon increase in the coil currents to maintain the bias at the desired increased level, thereby permitting the generator and prime mover to be returned to the desired value of constant mean speed.

Operation of the circuit when the torque is decreased, either in the clutch or dynamometer embodiment, is merely the inverse of the above descriptions of operation, as will readily be understood.

As was noted previously, the circuit operates to provide regenerative or positive feedback. That is, when the current supplied to the inductive load is increased (herein shown as initiated by a control voltage input in series with the feedback voltage), the grid bias of the control tube is raised thereby relatively to increase the current supplied to the inductive load. The net result is better regulation of the mean speed desired.

In view of the above, it will be seen that the several features of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A regenerative control circuit for an inductive load, comprising a grid-controlled rectifier tube feeding direct current pulses to said inductive load, an impedance shunted across said inductive load, the voltage appearing across said impedance being impressed upon the control grid of said grid-controlled rectifier for positive feedback, and means associated with said load-shunting impedance connected to provide unidirectional flow of current therethrough.

2. A regenerative control circuit for an inductive load, comprising a grid-controlled rectifier tube feeding direct current pulses to said inductive load, an impedance shunted across said inductive load, the voltage appearing across said impedance being impressed upon the control grid of said grid-controlled rectifier for positive feedback, and means associated with said load-shunting impedance connected to provide unidirectional flow of current therethrough upon inductive discharge of the load and otherwise to isolate the load-shunting impedance from the grid-controlled rectifier.

3. A regenerative control circuit for an inductive load, comprising a grid-controlled rectifier tube feeding direct current pulses to said inductive load, an impedance shunted across said inductive load, the voltage appearing across said impedance being impressed upon the control grid of said grid-controlled rectifier for positive feedback, means associated with said load-shunting impedance connected to provide unidirectional flow of current therethrough upon inductive discharge of the load and otherwise to isolate the load-shunting impedance from the grid-controlled rectifier, and a control voltage input fed in series with the feedback voltage to said control grid.

4. A regenerative control circuit for an inductive load, comprising a grid-controlled rectifier tube feeding direct current pulses to said inductive load, an impedance shunted across said inductive load, and a rectifier associated with said impedance permitting inductive discharge of the load therethrough, the voltage appearing across said impedance being impressed upon the control grid of said grid-controlled rectifier for positive feedback.

5. A regenerative control circuit for an inductive load, comprising a grid-controlled rectifier tube feeding direct current pulses to said inductive load, a rectifier and a load-shunting impedance connected in series across said inductive load, said rectifier being connected to permit inductive discharge of the load and isolate said impedance from the grid-controlled rectifier plate, the voltage appearing across said impedance being impressed upon the control grid of said grid-controlled rectifier for positive feedback, and means for initiating change of current in said inductive load.

6. A control circuit as set forth in claim 5 wherein the means for initiating change of current in the inductive load comprises a control voltage input impressed upon the grid of said grid-controlled rectifier in series with the voltage appearing across the load-shunting impedance.

7. A circuit for regulation of dynamoelectric apparatus comprising in series a field coil, an alternating current source and a grid-controlled rectifier tube feeding controlled direct current pulses to said field coil, a shunt circuit having an impedance shunted across the field coil, a valve in said coil-shunting circuit isolating said impedance from the plate of the grid-controlled rectifier and the alternating current source, said valve being connected to permit discharge of said coil through said impedance, and a grid circuit for said grid-controlled rectifier including in series said impedance and a speed responsive voltage source.

8. A circuit for regulation of dynamoelectric apparatus comprising in series a field coil, an alternating current source and a grid-controlled rectifier tube feeding controlled direct current pulses to said field coil, a shunt circuit having a resistance shunted across the field coil, a second rectifier in said coil-shunting circuit isolating said resistance from the plate of the grid-controlled rectifier and the alternating current source and permitting discharge of said coil through said resistance, and a grid circuit for said grid-controlled rectifier including in series said resistance and a speed responsive voltage source.

9. A circuit for regulation of dynamoelectric apparatus comprising in series a field coil, an alternating current source and a grid-controlled rectifier tube feeding controlled direct current pulses to said field coil, a resistance and a second rectifier tube connected in series across the field coil, said resistance being connected at one end to the cathode of said grid-controlled rectifier, and at the other end to the cathode of said second rectifier and to the control grid of said grid-controlled rectifier, and a filtering circuit across said resistance to provide a substantially constant current therethrough.

10. A circuit for regulation of dynamoelectric apparatus comprising in series a field coil, an alternating current source and a grid-controlled rectifier tube feeding controlled direct current pulses to said field coil, a resistance and a second rectifier tube connected in series across the field coil, said resistance being connected at one end to the cathode of said grid-controlled rectifier, and at the other end to the cathode of said second rectifier and to the control grid of said grid-controlled rectifier through a speed responsive voltage source, and a filtering circuit across said resistance to provide a substantially constant current therethrough.

11. A circuit for regulation of an eddy-current clutch comprising in series a clutch field coil, an alternating current source and a grid-controlled rectifier tube feeding controlled direct current pulses to said field coil, a resistance and a second rectifier tube connected in series across the field coil, said resistance being connected at one end to the cathode of said grid-controlled rectifier, and at the other end to the cathode of said second rectifier and to the control grid of said grid-controlled rectifier through a speed responsive voltage source, the speed responsive voltage source being connected so as to apply a negative voltage component to said control grid, and a filtering circuit across said resistance to provide a substantially constant current therethrough.

12. A circuit for regulation of a dynamometer comprising in series a field coil, an alternating current source and a grid-controlled rectifier tube feeding controlled direct current pulses to said field coil, a resistance and a second rectifier tube connected in series across the field coil, said resistance being connected at one end to the cathode of said grid-controlled rectifier, and at the other end to the cathode of said second rectifier and to the control grid of said grid-controlled rectifier through a speed responsive voltage source, the speed responsive voltage source being connected so as to apply a positive voltage component to said control grid, and a filtering circuit across said resistance to provide a substantially constant current therethrough.

13. A regenerative circuit for regulation of an electric slip coupling having an inductive field coil, comprising a grid-controlled rectifier tube feeding direct current pulses to said inductive field coil, an impedance shunted across said field coil, the voltage appearing across said impedance being impressed upon the control grid of said grid-controlled rectifier for positive feedback, means associated with said coil-shunting impedance connected to provide unidirectional flow of current therethrough upon inductive discharge of the coil and otherwise isolate the coil-shunting impedance from the grid-controlled rectifier, and a speed responsive voltage input fed in series with the feedback voltage to said control grid, the circuit elements being such that the feedback voltage will maintain control of the coil excitation to maintain substantially constant speed control after transient speed variation and a transient change in the speed responsive voltage.

14. A regenerative circuit for regulation of an electric clutch having an inductive field coil and a driven member comprising a grid-controlled rectifier tube feeding direct current pulses to said inductive field coil, an impedance shunted across said field coil, the voltage appearing across said impedance being impressed upon the control grid of said grid-controlled rectifier for positive feedback, means associated with said coil-shunting impedance connected to provide unidirectional flow of current therethrough upon inductive discharge of the coil and otherwise isolate the coil-shunting impedance from the grid-controlled rectifier, and a control voltage input responsive to the speed of the driven member fed in series with the feedback voltage to said control grid, the polarity of said speed responsive voltage being such as to apply a negative voltage component to the control grid, the circuit elements being such that the feedback voltage will maintain control of the coil excitation to maintain substantially constant speed control over the driven member after transient speed variation and a transient change in the speed responsive voltage.

15. A regenerative circuit for regulation of an electric dynamometer having an inductive field coil and a driving member comprising a grid-controlled rectifier tube feeding direct current pulses to said inductive field coil, an impedance shunted across said field coil, the voltage appearing across said impedance being impressed upon the control grid of said grid-controlled rectifier for positive feedback, means associated with said coil-shunting impedance connected to provide unidirectional flow of current therethrough upon inductive discharge of the coil and otherwise isolate the coil-shunting impedance from the grid-controlled rectifier, and a control voltage input responsive to the speed of the driving member fed in series with the feedback voltage to said control grid, the polarity of said speed responsive voltage being such as to apply a positive voltage component to the control grid, the circuit elements being such that the feedback voltage will maintain control of the coil excitation to maintain substantially constant speed control over the driving member after transient speed variation and a transient change in the speed responsive voltage.

16. A control circuit for speed regulation of an eddy-current slip coupling having a field coil, comprising a grid-controlled vacuum tube controlling the excitation of said field coil, a grid circuit and a plate circuit for said vacuum tube, said grid circuit including a speed-responsive voltage source and connections providing regenerative feedback from the plate circuit of said vacuum tube, said connections including a capacitor adapted to prevent oscillations in the plate circuit resulting from feedback.

17. A control circuit as set forth in claim 16 wherein said capacitor is connected between the grid and cathode of the vacuum tube.

18. A control circuit for speed regulation of an eddy-current slip coupling having a field coil, comprising a grid-controlled rectifier, said field coil being connected in the plate circuit of said vacuum tube, a grid circuit for said grid-controlled rectifier including a speed responsive voltage source and connections providing regenerative feedback from the plate circuit of said grid-controlled rectifier, said connections including a damping capacitor adapted to prevent oscillations in the control circuit resulting from said feedback.

JERROLD B. WINTHER.

REFERENCES CITED

The following references are of record in the file of this patent:

UNITED STATES PATENTS

| Number | Name | Date |
| --- | --- | --- |
| 1,438,976 | Wold | Dec. 19, 1922 |
| 2,277,284 | Winther | Mar. 24, 1942 |
| 2,411,122 | Winther | Nov. 12, 1946 |